US012263690B2

(12) United States Patent
Tanemo

(10) Patent No.: US 12,263,690 B2
(45) Date of Patent: Apr. 1, 2025

(54) PRINTING APPARATUS AND METHOD OF PRODUCING PRINTING APPARATUS

(71) Applicant: SEIKO EPSON CORPORATION, Tokyo (JP)

(72) Inventor: Masamichi Tanemo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 229 days.

(21) Appl. No.: 18/180,892

(22) Filed: Mar. 9, 2023

(65) Prior Publication Data

US 2023/0286303 A1 Sep. 14, 2023

(30) Foreign Application Priority Data

Mar. 11, 2022 (JP) ................................ 2022-037856

(51) Int. Cl.
*B41J 29/02* (2006.01)

(52) U.S. Cl.
CPC .................................... *B41J 29/02* (2013.01)

(58) Field of Classification Search
CPC ... B41J 29/02; B41J 2/175; B41J 29/00; B41J 29/13; B41J 29/38; B41J 29/393
See application file for complete search history.

(56) References Cited

U.S. PATENT DOCUMENTS

2019/0240991 A1 * 8/2019 Komagome .............. B41J 2/35

FOREIGN PATENT DOCUMENTS

JP 2002-314737 A 10/2002

* cited by examiner

*Primary Examiner* — Bradley W Thies
(74) *Attorney, Agent, or Firm* — Global IP Counselors, LLP

(57) ABSTRACT

A printing apparatus includes: a main body having a printing mechanism; a cover that is openable or closable by being rotated relative to the main body; a first substrate disposed in the main body; a second substrate disposed in the cover; a first connector mounted on the first substrate; and a second connector mounted on the second substrate. When the cover is open, the first connector and the second connector are separated from one another. In response to closing of the cover, terminal pins of the first connector and the second connector come into contact with one another.

8 Claims, 6 Drawing Sheets

PRINTING APPARATUS AND METHOD OF PRODUCING PRINTING APPARATUS

The present application is based on, and claims priority from JP Application Serial Number 2022-037856, filed Mar. 11, 2022, the disclosure of which is hereby incorporated by reference herein in its entirety.

BACKGROUND

1. Technical Field

The present disclosure relates to a printing apparatus and a method of producing such a printing apparatus.

2. Related Art

Printing apparatuses have recently been utilized in a large variety of environments, such as inside houses and offices. It is therefore necessary to develop and manufacture printing apparatuses with good usability so that all users can use them in the same manner.

JP-A-2002-314737 discloses an image-forming apparatus to which a recording medium that stores electronic information is attachable. This image-forming apparatus includes: a recording medium attached thereto; and an aperture via which the recording medium is detachable to the outside. Both the recording medium and the aperture are disposed adjacent to an outer surface of the image-forming apparatus other than the rear surface. As described in this document, the image-forming apparatus can provide improved workability of replacing a recording medium with another and attaching an additional recording medium thereto, thereby enabling short-time service maintenance within a small space.

It is effective to devise the position of an aperture in an image-forming apparatus in terms of space-saving service maintenance. In addition to the space-saving maintenance, however, the compactness is also necessary. Thus, there is a need to improve the space efficiencies of apertures and the interiors of such apparatuses.

SUMMARY

According to a first aspect of the present disclosure, a printing apparatus includes: a main body having a printing mechanism; a cover that is openable or closable by being rotated relative to the main body; a first substrate disposed in the main body; a second substrate disposed in the cover; a first connector mounted on the first substrate; and a second connector mounted on the second substrate. When the cover is open, the first connector and the second connector are separated from one another. In response to closing of the cover, terminal pins of the first connector and the second connector come into contact with one another.

According to a second aspect of the present disclosure, a method of producing a printing apparatus that includes a main body in which a first substrate is disposed and a cover in which a second substrate is disposed includes: adjusting relative positions of a first connector mounted on the first substrate and a second connector mounted on the second substrate; and covering the main body with the cover to bring terminal pins of the first connector and the second connector into contact with one another.

DESCRIPTION OF EXEMPLARY EMBODIMENTS

A description will be described below of some embodiments of the present disclosure, which are examples of the present disclosure and thus not intended to limit the disclosure. Such embodiments may incorporate various modifications and variations unless the spirit of the present disclosure changes. It should be noted that not all the components that will be described below are essential to the present disclosure.

A printing apparatus according to this embodiment includes: a main body having a printing mechanism; a cover that is openable or closable by being rotated relative to the main body; a first substrate disposed in the main body; a second substrate disposed in the cover; a first connector mounted on the first substrate; and a second connector mounted on the second substrate. When the cover is open, the first connector and the second connector are separated from one another. In response to closing of the cover, terminal pins of the first connector and the second connector come into contact with one another. Hereinafter, the embodiment will be described with reference to the accompanying drawings.

In this embodiment, the printing apparatus is an ink jet printer, which prints an image on a medium by discharging liquid (ink) onto the medium. However, the printing apparatus is not limited to an ink jet printer; alternatively, the printing apparatus may also be a dot impact printer, a thermal-transfer printer, a laser printer, or any other type of printer.

1. Functional Configuration of Printing Apparatus

Figure 1:
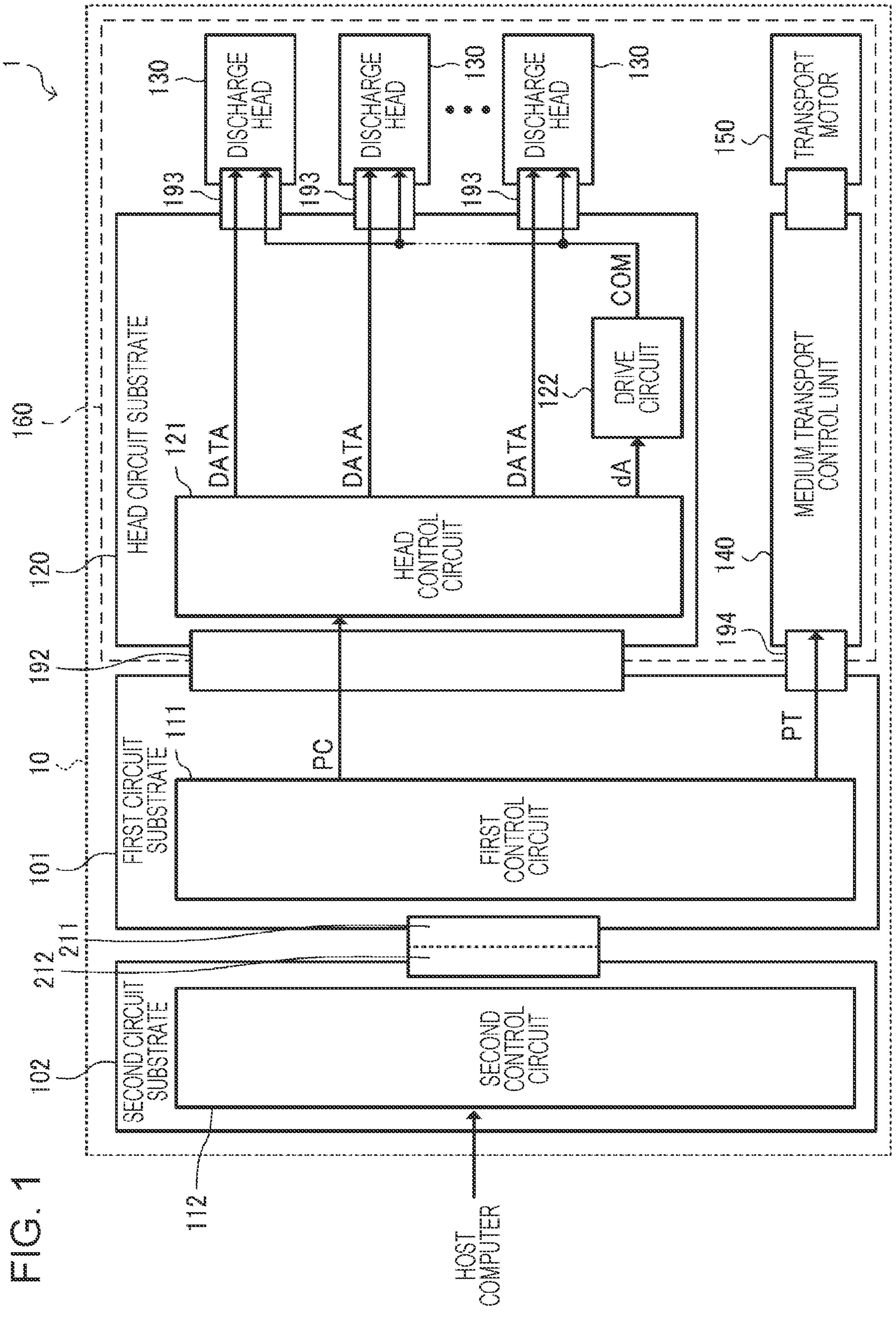
FIG. 1 illustrates a functional configuration of a printing apparatus according to an embodiment of the present disclosure.

FIG. 1 illustrates a functional configuration of a printing apparatus 1, which is an example of the printing apparatus according to this embodiment. As illustrated in FIG. 1, the printing apparatus 1 includes a printing unit 10. The printing apparatus 1 is configured to print a desired image on a medium by causing the printing unit 10 to place ink droplets on the medium at predetermined positions, based on print information received from a host computer (not illustrated).

In this embodiment, a medium on which an image is to be printed by the printing apparatus 1 is a sheet of paper. However, a medium to be used by the printing apparatus 1 is not limited to a sheet of paper; alternatively, the medium may also be a roll of paper. Furthermore, the material of the medium is not limited to paper; alternatively, the material may also be fabric, fiber, or plastic.

The printing unit 10 includes a first circuit substrate 101, a second circuit substrate 102, a head circuit substrate 120, a plurality of discharge heads 130, a medium transport control unit 140, and a transport motor 150.

The first circuit substrate 101 includes a first control circuit 111, whereas the second circuit substrate 102 includes a second control circuit 112. Each of the first control circuit 111 and second control circuit 112 outputs control signals for use in controlling individual components of the printing apparatus 1. In addition, the first control circuit 111 is electrically connected to the second control circuit 112 via a first connector 211 mounted on the first circuit substrate 101 and a second connector 212 mounted on the second circuit substrate 102. At least one of the first control circuit 111 and the second control circuit 112 may be implemented by a system on a chip (SoC) including a central processing unit (CPU).

When receiving the print information from the host computer, the second control circuit 112 performs an image process, such as a color conversion process, to generate intermediate data and then transmits the intermediate data to the first control circuit 111 mounted on the first circuit substrate 101 via both the second connector 212 and the first connector 211. When receiving this intermediate data, the first control circuit 111 mounted on the first circuit substrate 101 generates a signal for use in operating a printing mechanism 160 in accordance with the intermediate data. In short, a processor in the second control circuit 112 mounted on the second circuit substrate 102 transmits an instruction to the first control circuit 111 mounted on the first circuit substrate 101 via both the second connector 212 and the first connector 211. In accordance with this instruction, the first control circuit 111 generates a signal for use in operating the printing mechanism 160.

The first control circuit 111 transports a medium on which a printing operation is to be performed, in accordance with the signal that has been received from the host computer via the second control circuit 112. More specifically, the first control circuit 111 generates a transport control signal PT for use in transporting the medium on which the printing operation is to be performed and then transmits the transport control signal PT to the medium transport control unit 140 through a cable 194. When receiving the transport control signal PT from the first control circuit 111, the medium transport control unit 140 generates a drive control signal for use in controlling the driving of the transport motor 150 in accordance with the transport control signal PT and then transmits this drive control signal to the transport motor 150. When receiving the drive control signal, the transport motor 150 rotates so as to transport the medium in a predetermined direction.

In parallel with the above, the first control circuit 111 generates a print control signal PC for use in printing an image on a medium, based on the print information received from the host computer via the second control circuit 112 and then transmits the print control signal PC to the head circuit substrate 120 through a cable 192.

The print control signal PC is supplied from the first control circuit 111 to a head control circuit 121 in the head circuit substrate 120. When receiving the print control signal PC, the head control circuit 121 generates a plurality of print data signals DATA for the respective discharge heads 130 in accordance with the print control signal PC; each of the discharge heads 130 discharges ink onto a medium through a plurality of nozzles. The head control circuit 121 then transmits the print data signals DATA to the discharge heads 130. In parallel with this, the head control circuit 121 also generates a base drive signal dA, based on which a drive signal COM is to be generated, in accordance with the print control signal PC received from the first circuit substrate 101. The head control circuit 121 then transmits the base drive signal dA to a drive circuit 122. When receiving the base drive signal dA from the head control circuit 121, the drive circuit 122 generates the drive signal COM, the waveform of which is specified by the base drive signal dA and then transmits the drive signal COM to the discharge heads 130.

Each of the discharge heads 130 includes: the plurality of nozzles through which ink is to be discharged onto a medium; and a plurality of drive elements that drive so as to discharge the ink through corresponding nozzles in accordance with the drive signal COM. The discharge heads 130 are electrically connected to the head circuit substrate 120 through respective cables 193. When receiving a print data signal DATA from the head control circuit 121, each discharge head 130 selectively forwards the drive signal COM received from the drive circuit 122 to the drive elements, in accordance with the print data signal DATA. More specifically, each discharge head 130 forwards the drive signal COM to the drive elements corresponding to the nozzles through which the ink will be discharged onto a medium but does not forward the drive signal COM to the drive elements corresponding to the nozzles through which the ink will not be discharged onto the medium. In this way, the ink is discharged through the nozzles corresponding to the drive elements that have received the drive signal COM, whereas no ink is discharged through the nozzles corresponding to the drive elements that have not received the drive signal COM. In short, the discharge heads 130 selectively forward the drive signal COM to the drive elements in accordance with the print data signals DATA received from the head control circuit 121, thereby discharging the ink at timings specified by the print data signals DATA and through the nozzles designated by the print data signals DATA.

In this embodiment, as described above, the printing apparatus 1 is configured such that, in accordance with the print information received from the host computer, both the second control circuit 112 and the first control circuit 111 control the transport of a medium via the medium transport control unit 140 and simultaneously controls the operation of the head control circuit 121 mounted on the head circuit substrate 120. It is thereby possible to distinguish the nozzles through which the ink will be discharged onto a medium from the nozzles through which the ink will not be discharged. In short, the combination of the first control circuit 111 and the second control circuit 112 controls both the transport of a medium and the discharge timing of the ink, thereby causing the discharge heads 130 to place ink droplets on the medium at desired positions, namely, to form dots thereon at those positions. In this way, the printing apparatus 1 can print a desired image on the medium.

Hereinafter, the head circuit substrate 120, which performs the printing operation on a medium under the control of both the first circuit substrate 101 and the second circuit substrate 102, the plurality of discharge heads 130, the medium transport control unit 140, and the transport motor 150 are collectively referred to as the printing mechanism 160. In the printing unit 10, both the first control circuit 111 mounted on the first circuit substrate 101 and the second control circuit 112 mounted on the second circuit substrate 102 control the operation of the printing mechanism 160, in accordance with input information.

The printing apparatus 1 may further include a universal serial bus (USB) port and a local area network (LAN) port that are both connectable to an external apparatus through a LAN and USB cables. The printing apparatus 1 may read image information stored in a storage medium, such as a hard disk or flash memory, to which the USB or LAN port is connected and then may perform the printing operation based on the image information. The printing apparatus 1 may further include: a scanner unit that scans image information formed on a medium; and a facsimile unit that transmits or receives information via a telephone line. In other words, the printing apparatus 1 may be a multifunction product (MFP) that forms an image on a medium and scans an image formed on a medium.

In this embodiment, the first control circuit 111 mounted on the first circuit substrate 101 and the second control circuit 112 mounted on the second circuit substrate 102 may be implemented by a single processor.

2. Structure of Printing Apparatus

Next, a structure of the printing apparatus 1 will be described below. Prior to the description of the structure of the printing apparatus 1, the backward and forward directions of the printing apparatus 1 are defined, respectively, as the +X and −X directions; the right and left directions of the printing apparatus 1 viewed from the front are defined, respectively, as the +Y and −Y directions; and the vertical directions, or the downward and upward directions, of the printing apparatus 1 are defined, respectively, as the +Z and −Z directions.

Figure 2:
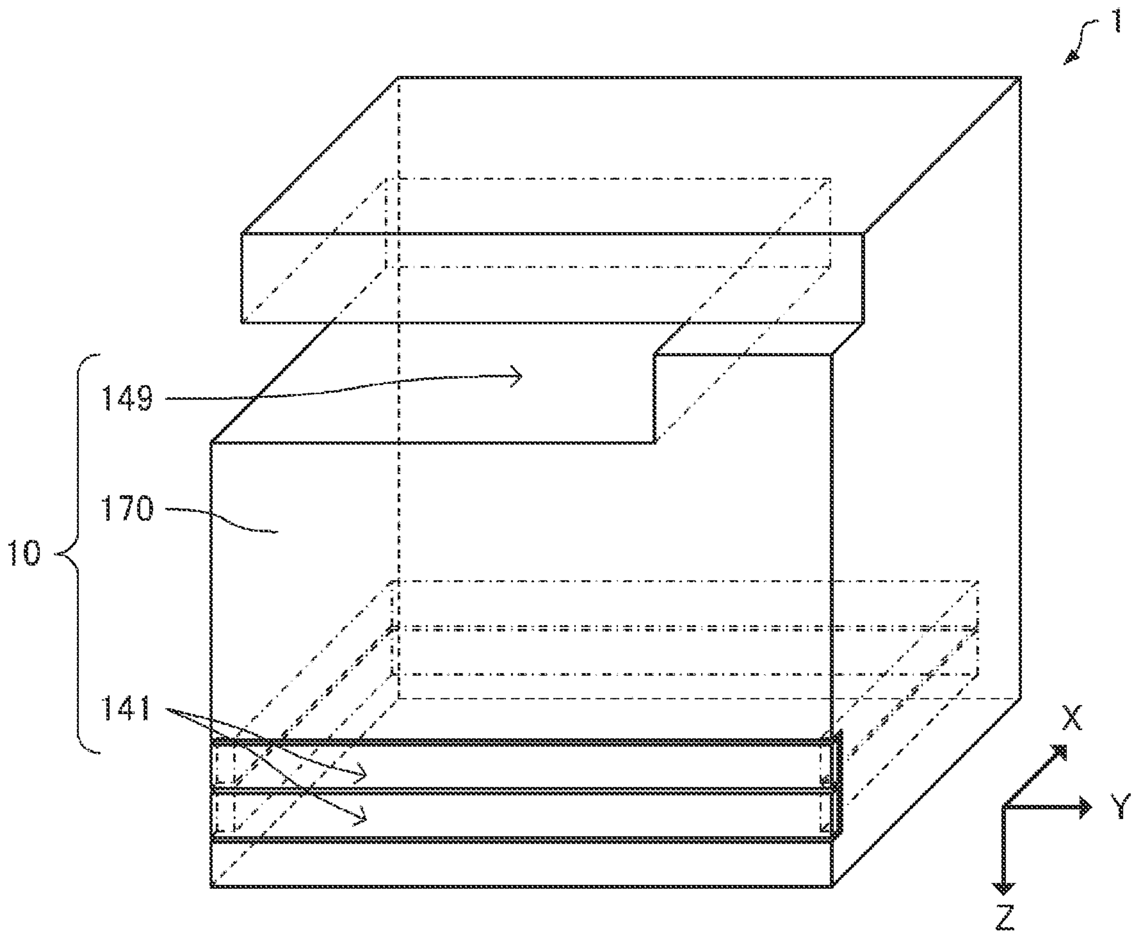
FIG. 2 illustrates an exterior structure of the printing apparatus.

FIG. 2 illustrates an exterior structure of the printing apparatus 1, which includes the printing unit 10.

The printing unit 10 includes a plurality of medium containers 141, a medium ejection tray 149, and a housing 170. Each of the medium containers 141 reserves the inner space for storing a medium on which the printing operation is to be performed. More specifically, each medium container 141 is disposed close to the +Z-side of the housing 170 and slidable from the interior of the housing 170 to the outside in the −X direction so that the inner space can be at least partly exposed. The medium ejection tray 149 is disposed on the −Z-side of the housing 170 and receives a medium on which the printing operation has been performed.

When starting the printing operation, the printing apparatus 1 configured above feeds a medium stored in a medium container 141 and transports the medium inside the housing 170. The printing apparatus 1 then forms an image on the medium being transported and ejects the medium to the medium ejection tray 149.

Figure 3:
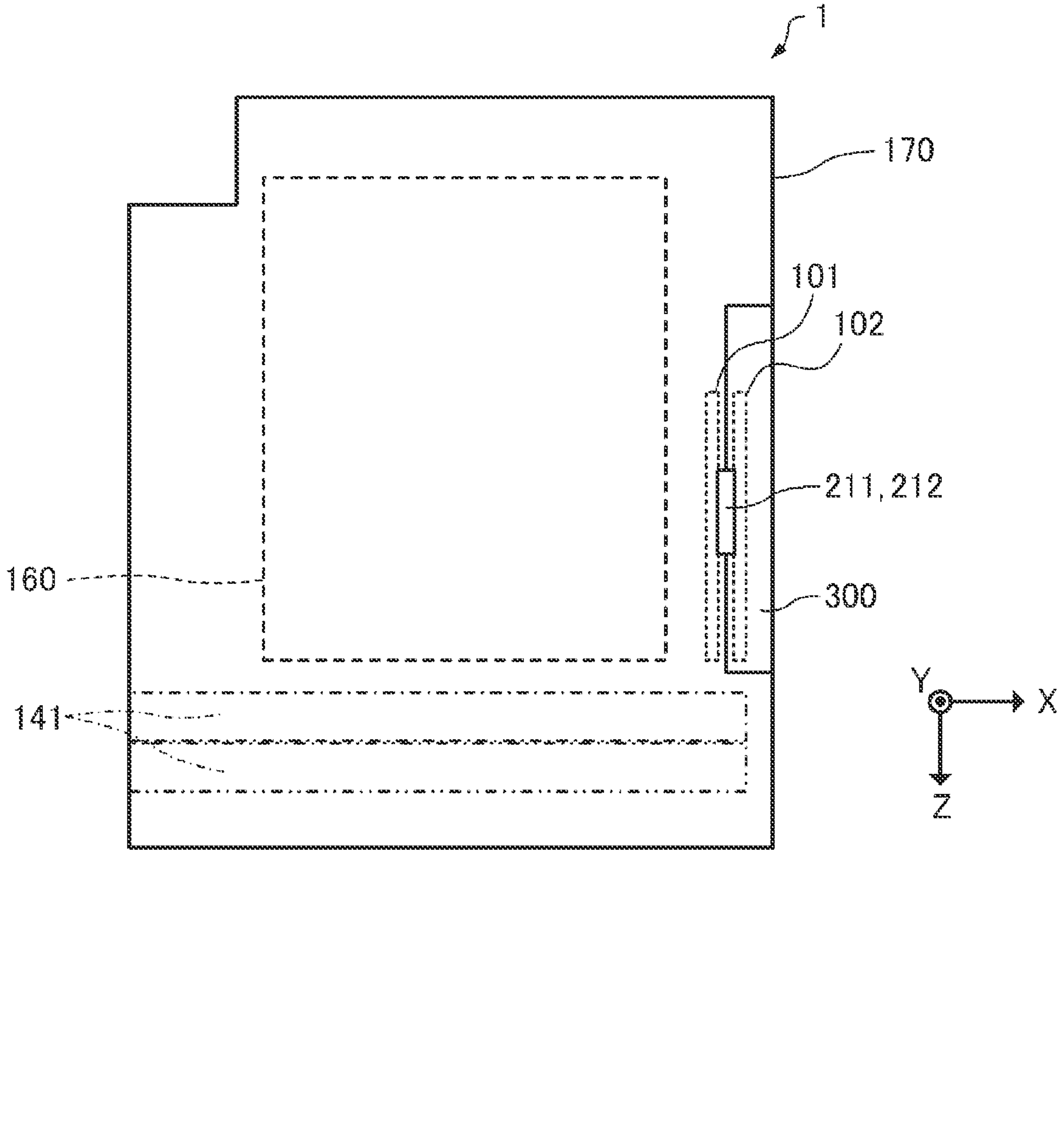
FIG. 3 illustrates an example of an internal structure of the housing.

Next, an internal structure of the housing 170 in the printing unit 10 will be described below. FIG. 3 illustrates an example of the internal structure of the housing 170 in the printing apparatus 1. As illustrated in FIG. 3, the printing apparatus 1 contains the first circuit substrate 101 and the printing mechanism 160 in the housing 170. When the cover 300 is closed, the second circuit substrate 102 is disposed inside the printing apparatus 1. The first circuit substrate 101 is fixed to the housing 170, whereas the second circuit substrate 102 is fixed to the cover 300. In the state of FIG. 3, the cover 300 is closed, and the first connector 211 is thereby kept in contact with the second connector 212 so that the first circuit substrate 101 stays electrically connected to the second circuit substrate 102.

When the cover 300 is closed, as illustrated in FIG. 3, both the first circuit substrate 101 and the second circuit substrate 102 are arranged next to the +X-side surface of the housing 170 so as to face one another while establishing the electrical connection therebetween. The printing mechanism 160 is disposed adjacent to the −Z-side of the medium containers 141 and inside the housing 170 at its substantial center.

Figure 4:
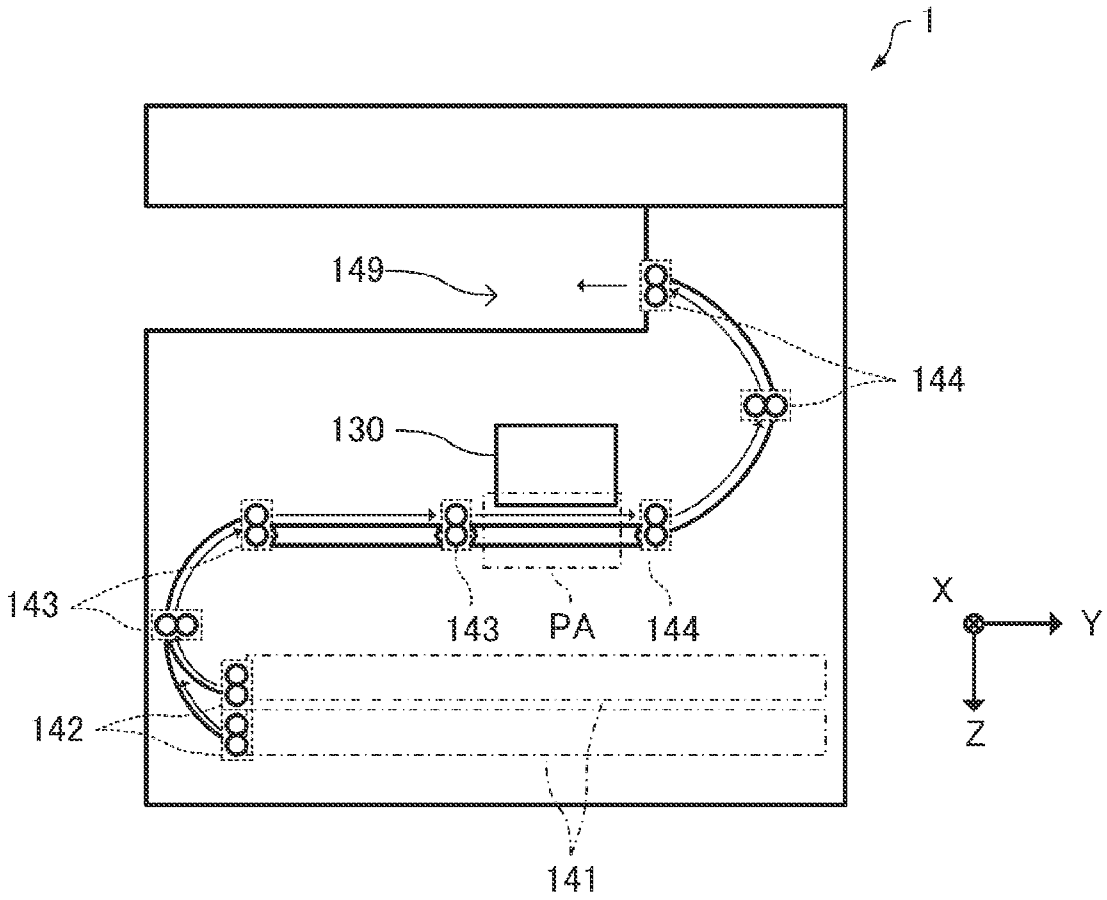
FIG. 4 illustrates an example of a route along which a medium is to be transported by a printing mechanism in the printing apparatus.

FIG. 4 illustrates an example of a route (referred to below as a transport route) along which a medium is to be transported by the printing mechanism 160 disposed inside the housing 170. As illustrated in FIG. 4, transport roller pairs 142, 143, and 144 are disposed inside the housing 170. Each of the transport roller pairs 142 to 144 includes a pair of drive and driven rollers. The drive and driven rollers of each of the transport roller pairs 142 to 144 pinch a medium while being rotated together by the transport motor 150, thereby transporting the medium in a predetermined direction.

More specifically, each transport roller pair 142 sequentially feeds media stored in the medium containers 141. It should be noted that, when sequentially feeding the media stored in the medium containers 141, each transport roller pair 142 may apply pressure to the media in the +Z direction. After one of the media has been ejected from a corresponding medium container 141, the transport roller pairs 143 feed the medium along the transport route while pinching the medium, thereby delivering the medium to a printing area PA facing the discharge heads 130. When the medium reaches the printing area PA, the discharge heads 130 place ink droplets on the medium at the timings specified by the print data signals DATA. After that, the transport roller pairs 144 feed the medium on which the ink droplets have been placed along the transport route while pinching the medium, thereby ejecting the medium to the medium ejection tray 149 outside the housing 170.

3. Main Body and Cover

Figure 5:
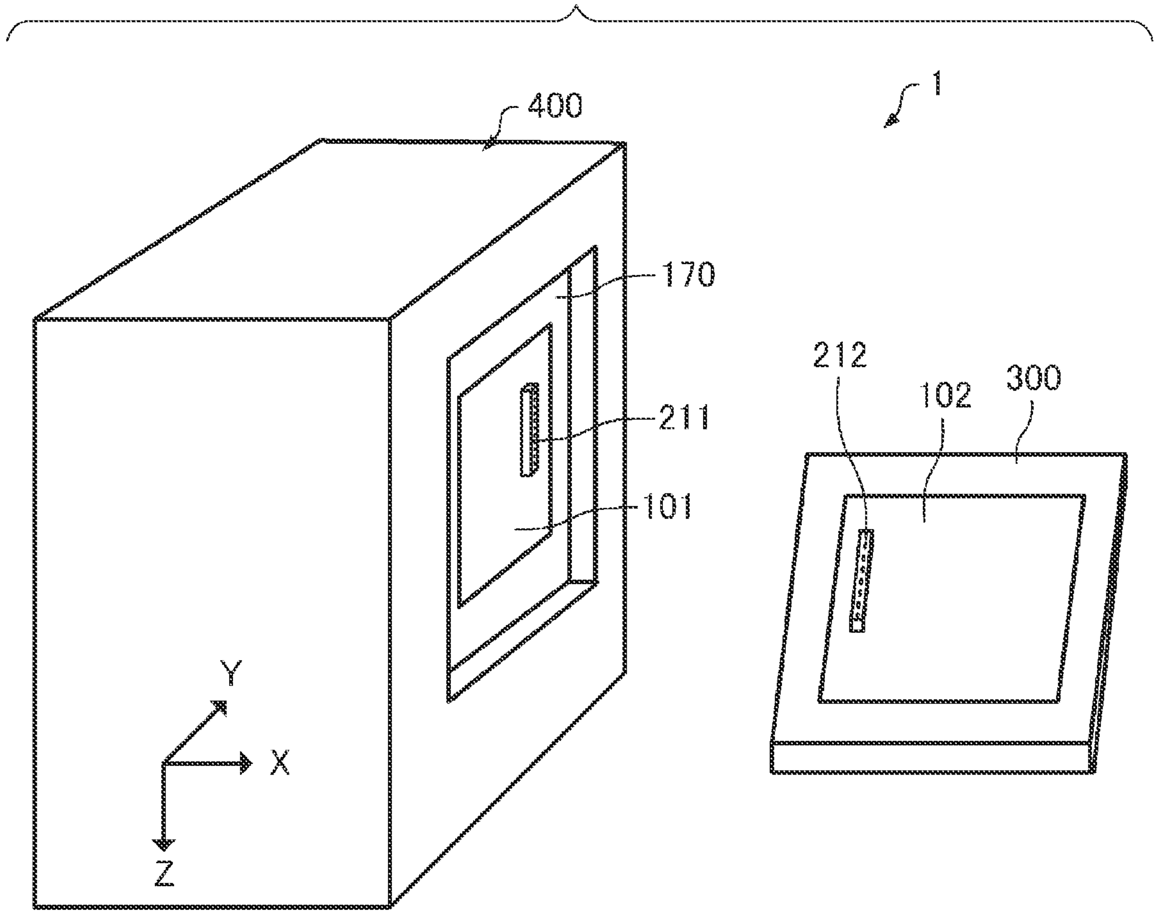
FIG. 5 is a perspective view of an example of the printing apparatus with the cover detached from the main body.

FIG. 5 is a perspective view of the printing apparatus 1 as viewed from the rear (+X-side) surface. The printing apparatus 1 is configured such that the cover 300 is detachable from the main body 400. When the cover 300 is detached from the printing apparatus 1, the remaining portion thereof is referred to as the main body 400. In FIG. 5, the cover 300 has been detached from the main body 400 so that the interior of the main body 400 is partly exposed to the outside through the aperture on the rear surface. As illustrated in FIG. 5, the printing apparatus 1 is configured such that the first circuit substrate 101 is disposed in the housing 170 of the main body 400 and the second circuit substrate 102 is disposed in the cover 300. In the state of FIG. 5, the cover 300 has been detached from the main body 400, and the first circuit substrate 101 is disposed inside the aperture formed on the +X-side surface of the main body 400 and exposed through this aperture.

When the cover 300 is detached from the main body 400, as illustrated in FIG. 5, the first connector 211 mounted on the first circuit substrate 101 is separated from the second connector 212 mounted on the second circuit substrate 102. When the cover 300 is attached to the main body 400 so as to cover the aperture on the +X-side surface of the main body 400, terminal pins of the second connector 212 come into contact with corresponding terminal pins of the first connector 211. In this way, both the first control circuit 111 and the second control circuit 112 become electrically connected together and can communicate with one another.

In the printing apparatus 1, when the cover 300 is closed, the first circuit substrate 101 faces the second circuit substrate 102 adjacent to the +X-side surface of the housing 170. In this embodiment, both the first control circuit 111 and the second control circuit 112 in the printing apparatus 1 are mounted, respectively, on the first circuit substrate 101 and the second circuit substrate 102, in other words, not mounted on a single substrate. This configuration enables the printing apparatus 1 to provide a high inner-space efficiency. Moreover, in the printing apparatus 1, as described above, both the first control circuit 111 and the second control circuit 112 are mounted, respectively, on the first circuit substrate 101 and the second circuit substrate 102, in other words, not mounted on a single substrate. Therefore, both the first control circuit 111 and the second control circuit 112 can be flexibly mounted in the housing 170 or the main body 400.

Figure 6:
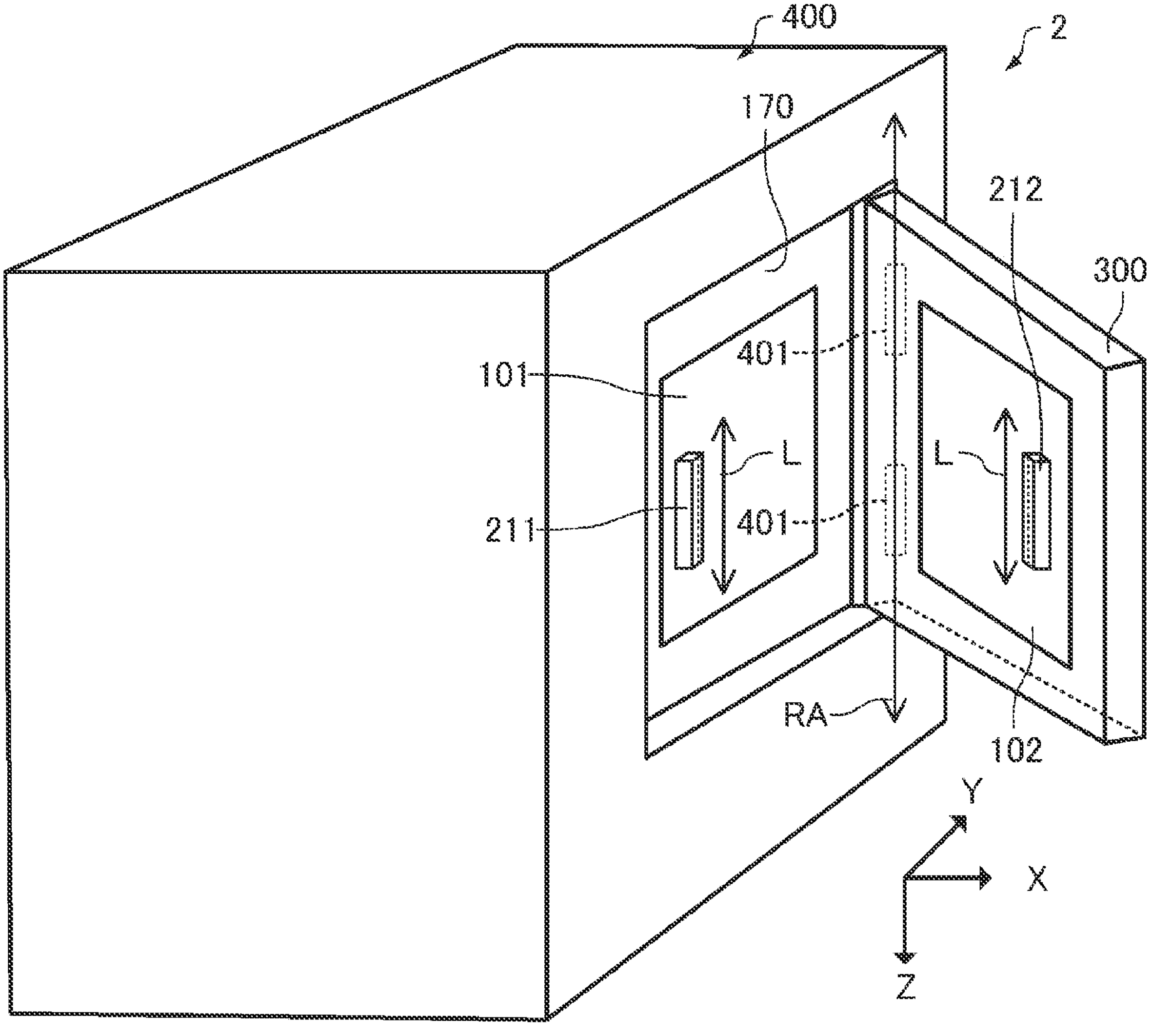
FIG. 6 is a perspective view of an example of a printing apparatus with its cover being open, according to a modification of the embodiment.

FIG. 6 is a perspective view of a printing apparatus 2 according to a modification of the foregoing embodiment as viewed from the rear (+X-side) surface. The printing apparatus 2 includes a cover 300 that is openable or closable. When the cover 300 is detached from the printing apparatus 2, the remaining portion thereof including a plurality of hinges 401 is also referred to as a main body 400. In the printing apparatus 2, the cover 300 is coupled in an openable/closable manner to the main body 400 through the hinges 401. In the state of FIG. 6, the cover 300 has been opened by being rotated around the hinges 401.

As illustrated in FIG. 6, similar to the above printing apparatus 1, the printing apparatus 2 is configured such that a first circuit substrate 101 is disposed in a housing 170 of the main body 400 and a second circuit substrate 102 is disposed in the cover 300. In the example of FIG. 6, the cover 300 is coupled to the main body 400 through two hinges 401, a rotation axis RA of which extends in the +Z direction; however, the number, positions, and angles, for example, of hinges 401 may be determined as appropriate.

In the printing apparatus 2, when the cover 300 is closed, the first circuit substrate 101 faces the second circuit substrate 102 adjacent to the +X-side surface of the housing 170. In this embodiment, both the first control circuit 111 and the second control circuit 112 in the printing apparatus 2 are mounted, respectively, on the first circuit substrate 101 and the second circuit substrate 102, in other words, not mounted on a single substrate. This configuration enables the printing apparatus 1 to provide a high inner-space efficiency. Moreover, in the printing apparatus 2, as described above, both the first control circuit 111 and the second control circuit 112 are mounted, respectively, on the first circuit substrate 101 and the second circuit substrate 102, in other words, not mounted on a single substrate. Therefore, both the first control circuit 111 and the second control circuit 112 can be flexibly mounted in the housing 170 or the main body 400.

When the cover 300 is closed, terminal pins of a first connector 211 mounted in the main body 400 and corresponding terminal pins of a second connector 212 mounted on the cover 300 need to precisely come into contact with one another. For this reason, the printing apparatus 2 has one or more positioning mechanisms that will be described below. First, the printing apparatus 2 may include a positioning mechanism for adjusting the relative positions of the cover 300 and the main body 400 before the first connector 211 and the second connector 212 come into contact with one another. In the example of FIG. 6, the hinges 401 correspond to this positioning mechanism. Second, the positioning mechanism may be another positioning mechanism formed of a mating unit, such as rails, pins, or claws. Employing one or more of these positioning mechanisms makes it possible to close the cover 300 so that the terminal pins of the first connector 211 and the corresponding terminal pins of the second connector 212 can precisely come into contact with one another.

In the printing apparatus 1 or 2, both of the first connector 211 and the second connector 212 may be floating connectors by which the terminal pins can be reliably brought into electrical contact with one another. Alternatively, both of the first connector 211 and the second connector 212 may be drawer connectors. The distance between the terminal pins of the first connector 211 and the second connector 212 may be longer than the distance between the terminal pins of other connectors.

In the printing apparatus 2, the first connector 211 is mounted on the side of the first circuit substrate 101 opposite each hinge 401; likewise, the second connector 212 is mounted on the side of the second circuit substrate 102 opposite each hinge 401. By mounting both the first connector 211 and the second connector 212 apart from the rotation axis RA of the hinges 401, the first connector 211 and the second connector 212 can be suppressed from coming into contact with one another in an inclined position. It is therefore possible to precisely bring the first connector 211 and the second connector 212 into contact with one another.

In the printing apparatus 2, a direction L in which the terminal pins (signal lines) of the first connector 211 are arranged and another direction L in which the terminal pins of the second connector 212 are arranged are both parallel to the rotation axis RA of each hinge 401. Arranging both the first connector 211 and the second connector 212 in this manner can suppress the first connector 211 and the second connector 212 from coming into contact with one another in an inclined position. In addition, this arrangement can also suppress an occurrence of an incident in which the terminal pins of the first connector 211 and the second connector 212 on the side adjacent to the rotation axis RA come into contact with one another before the terminal pins thereof on the opposite sides come into contact with one another. In short, when the first connector 211 and the second connector 212 come into contact with one another, all the terminal pins of the first connector 211 and the second connector 212 can substantially simultaneously come into contact with one another. It is therefore possible to suppress the first connector 211 and the second connector 212 from coming into contact with one another in an inclined position.

The printing apparatus 2 may further include a cable (not illustrated) through which the main body 400 supplies the second circuit substrate 102 with electricity at a higher voltage than a voltage applied via the first connector 211. This configuration can realize a design in which both the first connector 211 and the second connector 212 are used only for wire communication and in which an electricity supply route is continuously secured regardless of whether the cover 300 is open or closed.

Since the printing apparatus 2 has a cable through which electricity is supplied at a higher voltage than a voltage applied via the first connector 211, the main body 400 does not have to apply the second circuit substrate 102 with electricity at a high voltage via both the first connector 211 and the second connector 212. If electricity is supplied at a high voltage via both the first connector 211 and the second connector 212, a user needs to reliably couple the first connector 211 and the second connector 212 for safety reasons. In this embodiment, however, the main body 400 does not apply the second circuit substrate 102 with electricity at a high voltage through the cable. Therefore, even if the first connector 211 and the second connector 212 are incompletely coupled together, no serious accidents are likely to occur. Besides, since a large number of cables are unnecessary in this case, the inner space is less likely to be impaired. In short, the configuration in which the first connector 211 is directly coupled to the second connector 212 can provide a higher inner-space efficiency than a configuration in which a first circuit substrate 101 is coupled to a second circuit substrate 102 through a flat flexible cable (FFC). In addition, this configuration can also provide a high level of safety by supplying electricity at a high voltage through a cable.

4. Method of Producing Printing Apparatus

A method of producing a printing apparatus according to this embodiment uses a main body in which a first substrate is disposed and a cover in which a second substrate is disposed. This method includes: adjusting relative positions of a first connector mounted on the first substrate and a second connector mounted on the second substrate; and covering a main body with a cover to bring terminal pins of the first connector and the second connector into contact with one another.

A description will be given below of a method of producing a printing apparatus 1, which is an example of the method of producing a printing apparatus according to this embodiment. The method of producing the printing apparatus 1 uses a main body 400 in which a first circuit substrate 101 is disposed and a cover 300 in which a second circuit substrate 102 is disposed. More specifically, the production method includes covering a main body 400 with a cover 300 to bring a first connector 211 mounted on the first circuit substrate 101 and a second connector 212 mounted on the second circuit substrate 102 into contact with one another. Through this method, the printing apparatus 1 can be produced.

The production method according to this embodiment is applicable to a case where a manufacturer covers a main body 400 with a cover 300 during a process by which a printing apparatus 1 is assembled in a production plant.

It should be noted that the foregoing embodiment and modifications are examples and thus not limited to such examples. It is obvious that these embodiment and modifications may be combined partially or in whole as appropriate.

The present disclosure may include a configuration equivalent to those described in the embodiment and modifications. More specifically, the present disclosure may include a configuration with a function, a method, a result, a purpose, and an effect equivalent to those described in the embodiment and modifications. Furthermore, the present disclosure may also include a configuration in which some optional components described in the embodiment and modifications are replaced with others. The present disclosure may also include a configuration that produces substantially the same effect as that described in the embodiment and modifications or that can accomplish substantially the same purpose as in the embodiment and modifications. The present disclosure may also include a configuration in which the components in the embodiment and modifications are combined with those in known related technique.

Hereinafter, the following subject matters can be derived from the foregoing embodiment and modifications.

A printing apparatus includes: a main body having a printing mechanism; a cover that is openable or closable by being rotated relative to the main body; a first substrate disposed in the main body; a second substrate disposed in the cover; a first connector mounted on the first substrate; and a second connector mounted on the second substrate. When the cover is open, the first connector and the second connector are separated from one another. In response to closing of the cover, terminal pins of the first connector and the second connector come into contact with one another.

A printing apparatus, as described above, successfully provides a high inner-space efficiency and enables a first substrate and a second substrate to be flexibly disposed therein.

In the above printing apparatus, both of the first connector and the second connector may be floating connectors.

A printing apparatus, as described above, enables a first connector and a second connector to be smoothly brought into contact with one another.

In the above printing apparatus, both of the first connector and the second connector may be drawer connectors.

In the above printing apparatus, both of the main body and the cover may have a positioning mechanism that, when the cover is being closed, adjusts relative positions of the cover and the main body before the first connector and the second connector come into contact with one another.

A printing apparatus, as described above, enables a cover to be smoothly closed so as to bring a first connector and a second connector into contact with one another.

In the above printing apparatus, both of the first connector and the second connector may be connectors for use in conducting wire communication. The printing apparatus may further include a cable through which the main body supplies the second substrate with electricity at a higher voltage than a voltage applied via the first connector.

A printing apparatus, as described above, enables a first connector and a second connector to be efficiently utilized.

The above printing apparatus may further include a hinge through which the main body is coupled to the cover. The first connector may be mounted on a side of the first substrate opposite the hinge, whereas the second connector may be mounted on a side of the second substrate opposite the hinge.

A printing apparatus, as described above, enables a first connector and a second connector to be reliably brought into contact with one another.

The above printing apparatus may further include a hinge through which the main body is coupled to the cover. Directions in which signal lines of the first connector are arranged and in which signal lines of the second connector are arranged may be parallel to a rotation axis of the hinge.

A printing apparatus, as described above, successfully suppresses a first connector and a second connector from being brought into contact with one another in an inclined position.

In the above printing apparatus, the first substrate may generate a signal for use in operating the printing mechanism in accordance with an instruction received from a processor mounted on the second substrate via both the second connector and the first connector.

A method of producing a printing apparatus that includes a main body in which a first substrate is disposed and a cover in which a second substrate is disposed includes: adjusting relative positions of a first connector mounted on the first substrate and a second connector mounted on the second substrate; and covering the main body with the cover to bring terminal pins of the first connector and the second connector into contact with one another.

What is claimed is:

1. A printing apparatus comprising:
- a main body having a printing mechanism;
- a cover that is openable or closable by being rotated relative to the main body;
- a first substrate disposed in the main body;
- a second substrate disposed in the cover;
- a first connector mounted on the first substrate; and
- a second connector mounted on the second substrate, wherein
- when the cover is open, the first connector and the second connector are separated from one another, and
- in response to closing of the cover, terminal pins of the first connector and the second connector come into contact with one another.

2. The printing apparatus according to claim 1, wherein both of the first connector and the second connector are floating connectors.

3. The printing apparatus according to claim 1, wherein both of the first connector and the second connector are drawer connectors.

4. The printing apparatus according to claim 1, wherein both of the main body and the cover have a positioning mechanism that, when the cover is being closed, adjusts relative positions of the cover and the main body before the first connector and the second connector come into contact with one another.

5. The printing apparatus according to claim 1, further comprising a hinge through which the main body is coupled to the cover, wherein the first connector is mounted on a side of the first substrate opposite the hinge, and the second connector is mounted on a side of the second substrate opposite the hinge.

6. The printing apparatus according to claim 5, wherein both of the first connector and the second connector are connectors for use in conducting wire communication, the printing apparatus further comprising a cable through which the main body supplies the second substrate with electricity at a higher voltage than a voltage applied via the first connector.

7. The printing apparatus according to claim 1, further comprising a hinge through which the main body is coupled to the cover, wherein directions in which signal lines of the first connector are arranged and in which signal lines of the second connector are arranged are parallel to a rotation axis of the hinge.

8. The printing apparatus according to claim 1, the first substrate generates a signal for use in operating the printing mechanism in accordance with an instruction received from a processor mounted on the second substrate via both the second connector and the first connector.

* * * * *